Oct. 29, 1968  E. M. PROSEN  3,407,671
SPEED STEP-UP BALL BEARING EPICYCLIC DRIVE
Filed Dec. 19, 1966
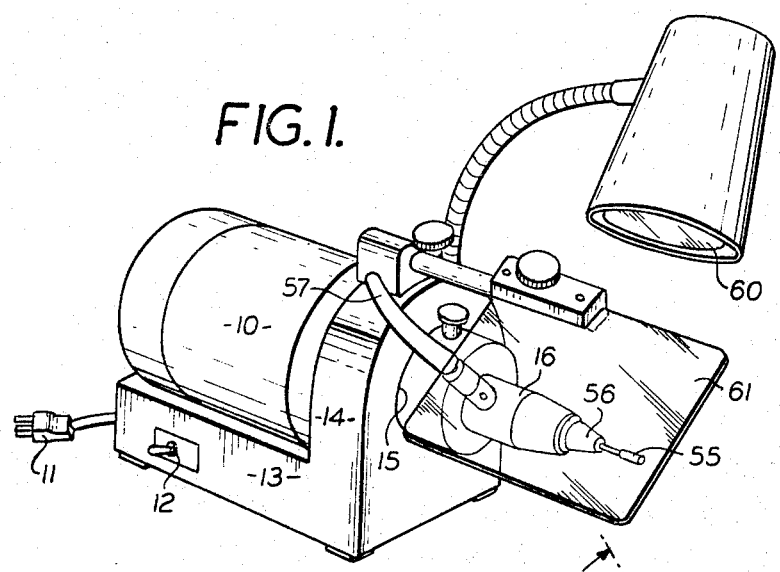
FIG. 1.
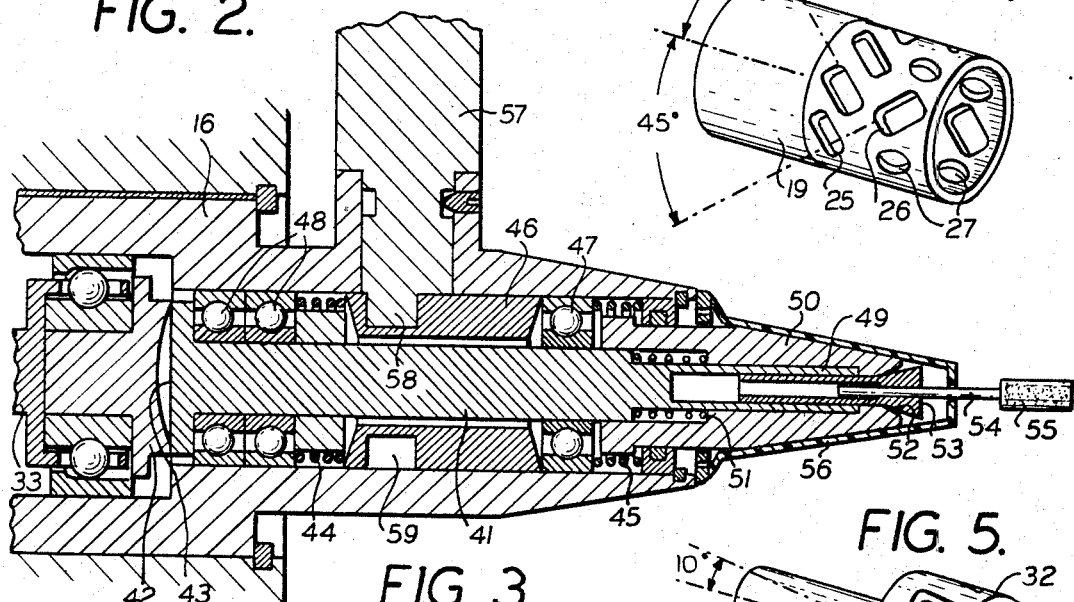
FIG. 2.
FIG. 4.
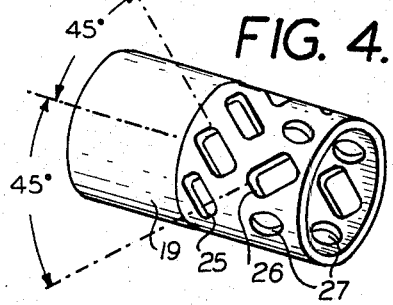
FIG. 3.
FIG. 5.
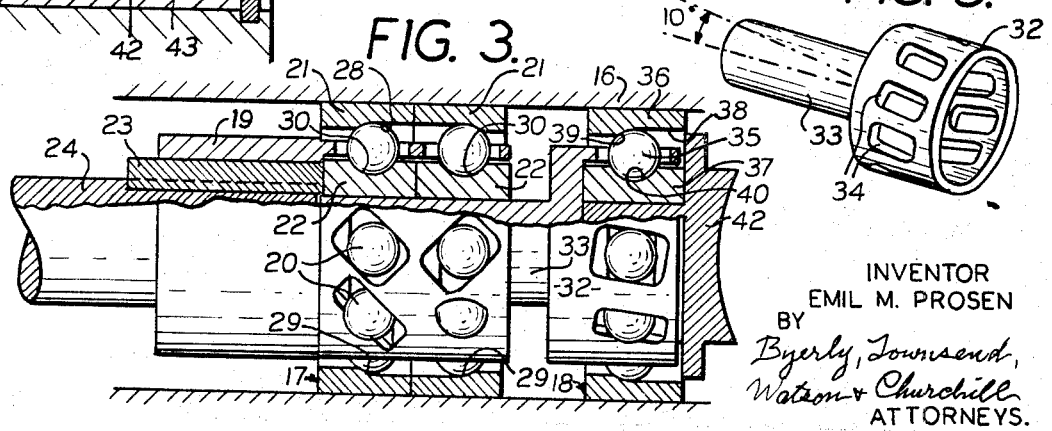
INVENTOR
EMIL M. PROSEN
BY
Byerly, Townsend,
Watson & Churchill
ATTORNEYS.

United States Patent Office 3,407,671
Patented Oct. 29, 1968

3,407,671
SPEED STEP-UP BALL BEARING EPICYCLIC DRIVE
Emil M. Prosen, Bala-Cynwyd, Pa., assignor to Nobilium Products, Inc., Philadelphia, Pa., a corporation of Pennsylvania
Filed Dec. 19, 1966, Ser. No. 602,714
10 Claims. (Cl. 74—64)

ABSTRACT OF THE DISCLOSURE

A machine for stepping up the output speed of a motor shaft by connecting to said shaft the driving cage of an epicyclic ball bearing transmission, the cage of which has oblique slots wherein the balls move outwardly under centrifugal force to engage an arcuate shoulder of diminishing diameter on a fixed outer race of the ball bearing transmission to insure a definite preload or traction between the outer and inner races and overcome slippage between the balls and races due to wear.

---

The present invention relates to a speed step-up ball bearing epicyclic drive.

In conventional epicyclic ball bearing speed-up transmissions, a spring force preload is employed and has been found to be destructive when the spring is under maximum tension, and as wear takes place on the balls and races, the spring tension lessens and slippage occurs between the balls and the races.

The principal objects of the present invention are to insure good traction contact between the balls and the races in a high speed step-up epicyclic transmission, reduce heat generation in such transmission and render the drive more effective especially when embodied in a high speed grinding machine.

The foregoing and other objects of the invention not specifically stated I accomplish by providing a two stage step-up ball bearing epicyclic transmission wherein the driving cages have oblique slots in which the balls are urged outwardly by centrifugal force into engagement with an arcuate shoulder of diminishing diameter on the outer race or races to insure good traction contact and compensate for wear. Preferably in the first stage, I provide a pair of inner races and a pair of outer races facing each other and wherein the cage is formed with two annular rows of oblique slots arranged in V-formation with the apices of the slots extending in the direction of rotation of the cage to balance the thrust on the balls when moved outwardly by centrifugal force. Also, to insure proper cooperative engagement with the races, I provide a plurality of circumferentially spaced circular holes between the slots in one row to prevent relative axial movement among the races and the cage. In the first stage of the transmission, the slots extend at an angle of between 40° and 45° to an axial plane of the transmission and in the second stage the angularity of the slots is substantially less than in the first stage.

The invention will be appreciated more fully from the detailed description which follows when considered in connection with the accompanying drawing wherein:

FIG. 1 is a perspective view of a machine embodying my invention.

FIG. 2 shows a diametrical section through the output end of the machine.

FIG. 3 shows a diametrical section through the two stages of the speed-up transmission, with parts broken away to illustrate the oblique slots in the cages.

FIG. 4 is a perspective view of the cage of the first speed-up stage of the transmission.

FIG. 5 is a perspective view of the cage of the second speed-up stage of the transmission.

Referring to the several figures of the drawing wherein the same reference characters are used to designate corresponding parts, I have shown the invention applied to a high speed grinding machine especially designed for dental laboratory use and adapted to step-up a motor speed of approximately 3500 r.p.m. to an output spindle speed of approximately 25,000 to 26,000 r.p.m.

The motor (not shown) is mounted within a housing 10 and is adapted to receive electric current from a source through a plug connector 11 and a manually controlled switch 12. The housing is mounted on a base 13 which has an end wall 14 formed with an opening 15, having mounted therein a stationary casing 16 which supports a two stage step-up ball bearing epicyclic transmission or drive indicated generally by the reference numerals 17 and 18 respectively.

The first stage 17 of the drive or transmission consists of a cage 19 in which is disposed a plurality of balls 20 between a pair of axially disposed outer races 21 and a pair of inner races 22 radially spaced from the outer races as best shown in FIG. 3. The cage 19 is formed with two rows of circumferentially spaced oblique slots 25 and 26, arranged in V-formation with the apices of the angles formed by the slots disposed in the direction of rotation of the cage. In the row of slots 26 there is formed between certain of the slots, round holes 27 for a purpose which will presently appear. The outer races 21 are fixed to the casing 16 and have alined cylindrical ball engaging surfaces 28, and at their remote ends are formed with annular arcuate shoulders 29 of diminishing diameter for a purpose which will be hereinafter described. The inner races 22 are rotatable and each is formed with a medial annular groove 30 for accommodating the balls 20. By virtue of the arrangement and disposition of the elements of the first stage 17 of the epicyclic drive, upon rotation of the cage 19 at high speed the balls 20 will move outwardly in the oblique slots 25 and 26 under centrifugal force into contact with the shoulders 29 to provide good traction on the balls; compensate for wear on the balls and races; insure a positive drive for the inner races 22; reduce heat generation to a minimum and thereby prolong the useful life of the transmission. At a motor driving speed of 3500 r.p.m. I have found that best results are achieved with a slot angularity of between 40° and 45° to an imaginary axial plane through the transmission. The round holes 27 in the row of slots 26 serve to prevent relative axial movement among the races and the cage. The dimensions of the balls and the races are so chosen to provide a multiplication of approximately 2.7 times the motor speed to the inner races 22.

The second stage 18 of the transmission consists of a cage 32, having a shaft 33 which is fast with and driven by the inner races 22 of the first stage 17. The cage 32, like the cage 19, has a row of circumferentially spaced oblique slots 34 in which are disposed a plurality of balls 35 between an outer race 36 and an inner race 37. The outer race 36 is fixed to the casing 16 and has a cylindrical ball engaging surface 38 and at its end adjacent the first stage is formed with an annular, arcuate shoulder 39 of diminishing diameter. The inner race 37 is rotatable and is formed with a medial circumferential groove 40 for accommodating the balls 35. Upon rotation of the cage 32 at high speed the balls 35 will move outwardly in the slots 34 under centrifugal force into contact with the shoulder 39 to provide good traction on the balls and compensate for wear on the balls and races and insure a positive drive for the inner races 37. At a driven speed of the cage 32 of approximately 9500 r.p.m., I have determined that best results are obtained with a slot angularity in the cage considerably less than that of the slots 26 in the cage 19 or approximately 10° to an imaginary axial plane through the cage 32, and with suitable dimensions of the balls and races the inner race can be made to attain a speed of between 25,000 and 26,000 r.p.m.

Fixedly carried by the inner race 37 to transmit its speed to an output shaft 41 of the transmission, is a clutch disc 42 having a concave face which is normally engaged by a cooperating flat face clutch disc 43 at the inner end of the shaft 41 which is spring biased into such engagement by coiled springs 44 and 45 and a spacer sleeve 46, suitable ball bearings 47 and 48 being provided between said shaft 41 and the casing 16 to insure smooth rotation of said shaft.

Slidably mounted on the outer end 49 of the shaft 41 is a nose cone 50 which is urged outwardly by a spring 51, said nose cone 50 having a bore of different diameters which at its outer end is tapered radially inward as shown at 52 to engage a collet 53. Removably carried by the collet 53 is a mandrel 54 on which may be mounted a suitable tool 55, such as a grinding wheel. Mounted on the nose cone 50 in enclosing relation to the end of the collet and mandrel is a protective cone 56 formed of suitable plastic material such as Teflon to prevent foreign matter from gaining access to the interior of the driving and clutching means.

Carried rotatively by the casing 16 is a cam lever 57 at the inner end of which is an eccentric pin 58 which engages in an annular slot 59 in the spacer sleeve 56. Manual rotation of the cam lever functions to move the shaft 16 and with it the clutch disc 43 against the force of springs 44 and 45 out of engagement with the clutch disc 42 when the tool 55 is not in use. Further rotation of the cam lever in the same direction functions to move the collet outwardly to disengage the mandrel 54.

To provide satisfactory illumination at the grinding wheel 55 a light source 60 is mounted on the housing 10. To protect the operator from dust resulting from grinding operations a transparent shield 61 is mounted adjustably on the housing.

From the foregoing detailed description it will be appreciated that I have provided a machine which in use performs all of its intended functions as set forth in the objects of the invention at the beginning of this specification.

What I claim is:

1. A machine for stepping up the output speed of a motor shaft, comprising a ball bearing epicyclic transmission having a fixed outer race, a rotatable inner race, a cage interposed between said races adapted to be driven by said motor shaft and torque transmitting balls carried by the cage in contact with both races, characterized in that the outer race has an annular arcuate shoulder of diminishing diameter and the cage has a plurality of circumferentially spaced oblique slots within which the balls are urged outwardly by centrifugal force into contact with said shoulder.

2. A machine according to claim 1, wherein the oblique slots in the cage form an angle of between 40° and 45° with an imaginary axial plane of the transmission.

3. A machine according to claim 1, wherein there are two coaxially disposed inner races and two cooperating coaxial outer races, said outer races having at their remote ends an annular arcuate shoulder of diminishing diameter, and the cage has two rows of circumferentially spaced oblique slots arranged in V-formation with the apices of the slots disposed in the direction of rotation of the cage.

4. A machine according to claim 3, wherein one of the rows of slots in the cage also has round holes therein interposed between certain oblique slots for accommodating balls to prevent relative axial movement among the races and the cage.

5. A machine according to claim 1, wherein the output speed of the motor shaft is accomplished in two stages by having the inner race of the first stage coupled to the cage of the second stage in which second stage the outer race is fixed and the inner race is rotatable and control means are provided for clutching and unclutching the inner race of the second stage to an output shaft of the machine.

6. A machine according to claim 5, wherein the first stage has two coaxially disposed inner races and two cooperating coaxial outer races, said outer races having at their remote ends an annular arcuate shoulder of diminishing diameter and the cage has two rows of circumferentially spaced oblique slots arranged in V-formation with the apices of the slots disposed in the direction of rotation of the cage and the slots in each row form an angle of between 40° and 45° with an imaginary axial plane passing through the transmission.

7. A machine according to claim 6, wherein the cage of the second stage has oblique slots disposed in the same general direction as one row of slots in the cage of the first stage and the slots in the second stage from an angle of approximately 10° with an imaginary axial plane passing through the transmission.

8. A machine according to claim 5, further characterized in that the control means comprises a cam lever.

9. A machine according to claim 8, wherein the cam lever is also operative to control a collet and chuck for holding a tool supporting mandrel at the output end of the transmission.

10. A machine according to claim 9, further characterized in that a protective cone engages over the collet, chuck and mandrel to prevent foreign matter from gaining access to the driving and clutching means.

References Cited

UNITED STATES PATENTS

| | | | |
|---|---|---|---|
| 1,858,696 | 5/1932 | Weiss | 74—64 |
| 2,178,657 | 11/1939 | Travnicek | 74—64 |
| 2,585,886 | 2/1952 | Whitlow | 74—64 |

FOREIGN PATENTS

| | | |
|---|---|---|
| 67,783 | 7/1929 | Sweden. |
| 71,677 | 4/1931 | Sweden. |

FRED C. MATTERN, Jr., *Primary Examiner.*

W. S. RATLIFF, *Assistant Examiner.*